May 5, 1959 J. J. BILLIN ET AL 2,885,472

AUTOMATIC GAIN CONTROL CIRCUITS FOR TELEVISION RECEIVERS

Filed Oct. 25, 1954

Inventors
J. J. Billen
I. Godier
R. C. Hall
By Glascock Downing & Seebold
Attys

United States Patent Office 2,885,472
Patented May 5, 1959

2,885,472

AUTOMATIC GAIN CONTROL CIRCUITS FOR TELEVISION RECEIVERS

James John Billin, Isleworth, Ivan Godier, Ealing, London, and Ronald Charles Hall, Cowley, England, assignors to Electric & Musical Industries Limited, Hayes, Middlesex, England, a company of Great Britain Application October 25, 1954, Serial No. 464,545

Claims priority, application Great Britain October 27, 1953

4 Claims. (Cl. 178—7.3)

This invention relates to automatic gain control circuits for television receivers.

In the specification of United States Patent No. 2,241,553 an automatic gain control circuit for television receivers is described, in which automatic gain control potentials are obtained by peak rectifying the vision modulation after the synchronising signals have been reduced in amplitude to such an extent that one extremity of the resultant signals corresponds to minimum vision modulation.

The object of the present invention is to provide in a television receiver an improved circuit whereby one extremity of vision and synchronising signals can be caused to correspond to minimum vision modulation.

According to the present invention there is provided in a television receiver an automatic gain control circuit comprising a separator, a path for feeding demodulated vision signals and synchronising pulses to the input of said separator, means for deriving synchronising pulses separated from the vision signals from the output of said separator, a unidirectionally conducting device, means for feeding said synchronising pulses from the output of said separator through an impedance to said device, a second impedance connecting said path to said device to feed said demodulated vision and synchronising pulses to said device, said impedances being chosen to cause the synchronising pulses fed from said separator to oppose the synchronising pulses fed through said second impedance, thereby to cause one extremity of the resultant signals to correspond to minimum vision modulation, said device rectifying the peaks of said resultant signals to provide automatic gain control potentials.

Figure 1:
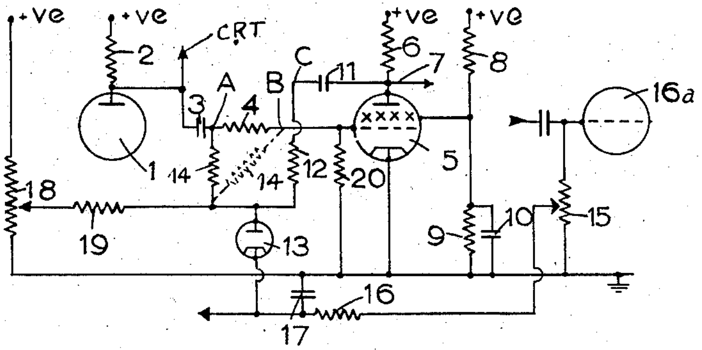
Figure 7:
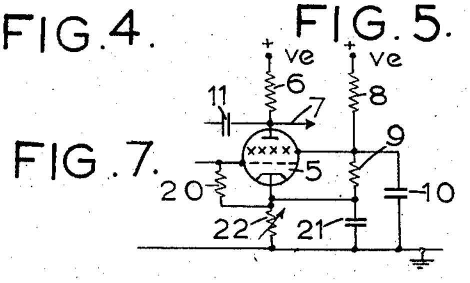
Figure 8:
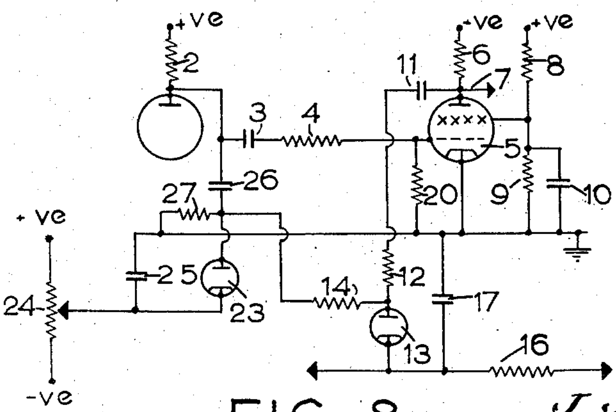

In order that the said invention may be clearly understood and readily carried into effect, it will now be more fully described with reference to the accompanying drawings, in which:

Figure 1 illustrates a portion of a circuit of a television receiver embodying the invention, Figures 2, 3, 4, 5 and 6 are explanatory diagrams, and Figures 7 and 8 illustrate modifications of the circuit shown in Figure 1.

As shown in Figure 1, the reference numeral 1 indicates the video amplifier of a television receiver, the anode of said amplifier being connected through a resistance 2 to a source of positive potential. Synchronising pulses and vision signals appear at the anode of the amplifier 1 with the synchronising pulses extending in the positive direction, these combined signals being fed through a path comprising a coupling condenser 3 and resistance 4 to the input to a separator. The separator in the embodiment shown includes a thermionic valve 5 and the combined signals are fed to the control electrode of the valve. A leak resistance 20 is provided which is connected to earth as shown or to a low positive potential. The control electrode/cathode of the valve 5 functions as a diode and serves to set the level of the signals fed to the control electrode of said valve with the tips of the synchronising pulses at earth potential. The valve 5 is arranged to function to separate the synchronising pulses from the vision signals so that the output signals appearing at the anode of the valve 5, which is connected to a source of positive potential through a resistance 6, are substantially free of the vision signals. The separated synchronising pulses appearing at the output of the valve 5 are fed by lead 7 to the usual scanning waveform generators of the receiver. The valve 5 is shown as a screened grid valve and the screening grid is maintained at a positive potential by the potential divider resistances 8 and 9 and is decoupled to earth by shunt condenser 10. The anode of the valve 5 is connected through a blocking condenser 11 and a resistance 12 to the anode of a diode rectifier 13. The synchronising pulses and the vision signals are also fed to the anode of said diode 13 through a second path comprising a resistance 14 connected to the junction between the condenser 3 and resistance 4 or to the control electrode of valve 5 and shown in dotted lines. The cathode of the diode 13 is connected to a point of negative potential which may be derived from a tapping point on a resistance 15, which may be associated with the control electrode circuit of another valve 16*a* of the television receiver, which may be a valve which amplifies the line frequency scanning waveform. The tapping point on the resistance 15 is connected to the cathode of the diode 13 through a resistance 16, a smoothing condenser 17 being arranged between the end of the resistance 16 and which is connected to the cathode of the diode 13 and earth.

With the circuit shown in the drawing the vision signals and synchronising pulses are fed via the resistance 14 to the anode of the diode 13 and also fed to the anode of the diode 13 are synchronising pulses from the anode of the valve 5.

Figure 2:
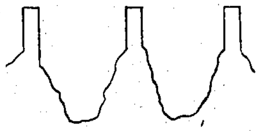
Figure 3:
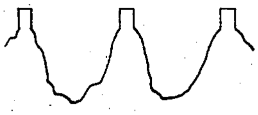
Figure 4:
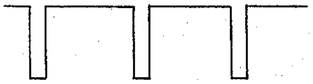
Figure 5:
Figure 6:
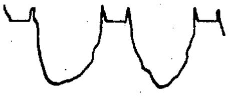

When the resistance 14 is connected to the junction of the condenser 3 and resistance 4 the waveform appearing at point A in Figure 1 and fed to the diode 13 is as shown in Figure 2 whilst if the resistance 14 is connected to the control electrode of the valve 5 as shown in dotted line in Figure 1 the waveform appearing at point B in Figure 1 and as shown in Figure 3 will be fed to the diode 13. It will be observed from Figure 3 that the synchronising pulse amplitude is reduced compared with that shown in Figure 2. The amplitude of the synchronising pulses appearing at point C in Figure 1 and as shown in Figure 4 is considerably greater than the synchronising pulse amplitude fed through the resistance 14 to the diode 13 and by suitable choice of the values of the resistances 12 and 14 the synchronising pulses at the anode of the diode 13 are cancelled or substituted by negative going pulses into the vision signals, as shown respectively in Figures 5 and 6, so that the diode 13 can function in the manner described in the specification of the aforesaid patent to generate automatic gain control potentials which are smoothed by the condenser 17 and fed to suitable points in the television receiver to effect the automatic gain control. The resistance 14 is arranged to be considerably greater than the resistance 2 so that very little loss in amplitude of the synchronising pulses at the control electrode of the valve 5 occurs due to negative feedback of synchronising pulses through resistance 12. The resistance 12 is also arranged to be considerably greater than the resistance 4, with the result that the amplitude of the vision signals appearing at the anode of the valve 5 is insignificant, so that this valve effectively separates the synchronising pulses from the vision signals. The resistance 4 serves to prevent reduction of amplitude of the synchronising pulses at the point A or at the modulating electrode of the cathode ray tube which is normally connected to lead CRT, which would otherwise occur due to the low impedance of the control electrode/cathode path of the valve 5 when the latter is conducting. The resistance 16 is made substantially greater than the resistance 20, so that when no signals are present, the negative voltage appearing at the control electrode of the valve 5 is insufficient to render the valve non-conducting, especially if the resistance 20 is connected to earth and not to a low positive potential. The diode 13 is required to be slightly conducting during the occurrence of the black level portions following the synchronising pulses irrespective of the amplitude of the signals at the anode of the diode 13 and therefore the negative voltage from the resistance 15 is made effectively always greater than the most positive potential of the combined signal appearing at the anode of the diode 13.

If desired, manual control of gain may be effected by varying the effective D.C. level at the anode of the diode 13 by feeding a positive voltage thereto from a tapping point on a potentiometer 18 which is connected to a source of positive potential and feeding this voltage through a resistance 19 to the anode of the diode 13. Such manual control of gain serves as a contrast control.

Figure 7 illustrates an alternative form of manual gain or contrast control which is obtained by varying the potential of the cathode of valve 5 by means of a variable resistance 22, so that the effective level to which the tips of synchronising pulses are restored by the grid/cathode action of the valve is varied. In order that the valve 5 may continue to function correctly as a synchronising pulse separator, the resistance 20 and the screen potential dividing resistor 9, which is substantially less resistive than 8, are connected to the cathode of valve 5 and not to earth and are decoupled by condenser 21 as shown. It is found that when certain types of valve are employed for the valve 5 improved constancy of separation of the synchronising pulses with adjustment of the resistance 22 can be effected by connecting the resistance 20 to the junction point of resistances 8 and 9 and not to the cathode of the valve 5 as shown.

Another way of obtaining a manual gain or contrast control is as shown in Figure 8. It will be appreciated that the manual gain control employed in Figures 1 and 7 serves to vary the level of the tips of the synchronising pulses, the valve 8 as aforesaid serving to set the level due to the grid/cathode action of the valve 5, so that the level of the synchronising pulses is fixed at the anode of the diode 13 and the manual contrast control then operates to vary this fixed level for manual gain or contrast control purposes. In Figure 8 the resistance 14, instead of being connected in the direct current path of the control electrode of the valve 5 is connected at a point prior to the condenser 3 so that the valve 5 does not then serve to set the level of the tips of the synchronising pulses at the anode of the diode 13. In Figure 8 a diode 23 is provided which is coupled to the valve 2 by the condenser 26 and leak resistance 27 and the resistance 14 is connected to a point between the condenser 26 and the anode of the diode 23. The diode 23 serves to set the level of the tips of the synchronising pulses at the anode of the diode 13, the level being varied manually by the setting of the cathode voltage of the diode 23 which is connected to a tapping point on potentiometer 24, arranged between a source of both positive and negative potential with respect to earth and decoupled to earth by condenser 25. The negative potential may be the same as that to which resistance 16 is connected.

Although the invention has been described above on the assumption that it will be employed with television signals in which the synchronising pulses reduce the amplitude of the carrier wave, i.e. so called "positive" modulation, it will however be appreciated that the invention can also be employed with so-called "negative" modulation, i.e. in which the synchronising pulses are of maximum carrier wave amplitude. When employing the invention with negative modulation, it will of course be required to ensure that the vision signals are of the same polarity as the anode of the valve 1, that is to say, with the synchronising pulses extending in a positive direction before employing the gain control signals to effect gain control. It will also be desirable to employ a circuit to reverse the sense of any interference pulses having an amplitude greater than the synchronising pulses which would otherwise prevent satisfactory level setting being effected by the separator 5.

What we claim is:

1. In a television receiver the provision of an automatic gain control circuit comprising a separator, a path for feeding demodulated vision signals and synchronising pulses to the input of said separator, means for deriving synchronising pulses separated from the vision signals from the output of said separator, a unidirectionally conducting device, means for feeding said synchronising pulses from the output of said separator through an impedance to said device, a second impedance connecting said path to said device to feed said demodulated vision and synchronising pulses to said device, means whereby said impedances cause the synchronising pulses fed from said separator to oppose the synchronising pulses fed through said second impedance, thereby to cause one extremity of the resultant signals to correspond to minimum vision modulation, means whereby said device rectifies the peaks of said resultant signals to provide automatic gain control potentials.

2. In a television receiver according to claim 1, wherein said separator has a control electrode and a cathode and said path feeds said demodulated vision signals and synchronising pulses to said control electrode, means whereby the cathode to control electrode space sets the level of the tips of said pulses, and means including of variable potential connected to one electrode of said device to provide manual gain or contrast control.

3. In a television receiver according to claim 1, wherein said separator has a control electrode and a cathode and said path feeds said demodulated vision signals and synchronising pulses to said control electrode, means whereby the cathode to control electrode space sets the level of the tips of said pulses, and means including a variable resistance in the cathode circuit of said separator to provide manual gain or contrast control.

4. In a television receiver according to claim 1, wherein said means for feeding said pulses to said device includes a condenser, and means including a rectifier is provided to set the level of the tips of said pulses, and one electrode of said rectifier is connected to means including a source of variable potential to provide manual gain or contrast control.

References Cited in the file of this patent

UNITED STATES PATENTS

| | | |
|---|---|---|
| 2,249,533 | Lewis | July 15, 1941 |
| 2,606,247 | Fyler | Aug. 5, 1952 |